United States Patent
Bade et al.

(10) Patent No.: US 11,640,199 B2
(45) Date of Patent: May 2, 2023

(54) METHOD FOR OPERATING AN ASSIST SYSTEM FOR A VEHICLE, AND ASSIST SYSTEM

(71) Applicant: Bayerische Motoren Werke Aktiengesellschaft, Munich (DE)

(72) Inventors: Florian Bade, Munich (DE); Moritz Blume, Munich (DE); Martin Buchner, Munich (DE); Julia Niemann, Berlin (DE); Michael Wolfram, Poing (DE); Joris Wolters, Amersfoort (NL)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 491 days.

(21) Appl. No.: 16/796,706

(22) Filed: Feb. 20, 2020

(65) Prior Publication Data

US 2020/0192476 A1 Jun. 18, 2020

Related U.S. Application Data

(63) Continuation of application No. PCT/EP2018/062668, filed on May 16, 2018.

(30) Foreign Application Priority Data

Aug. 21, 2017 (DE) ...................... 10 2017 214 546.3

(51) Int. Cl.
*G06F 3/01* (2006.01)
*G06T 7/80* (2017.01)
(Continued)

(52) U.S. Cl.
CPC ................ *G06F 3/013* (2013.01); *G06T 7/80* (2017.01); *G06V 20/59* (2022.01); *B60W 40/08* (2013.01);
(Continued)

(58) Field of Classification Search
CPC ........... G06F 3/013; G06T 7/80; G06V 20/59; B60W 40/08; B60W 2050/0083;
(Continued)

(56) References Cited

U.S. PATENT DOCUMENTS

| | | | | |
|---|---|---|---|---|
| 2010/0238291 A1* | 9/2010 | Pavlov | ...................... | G06T 7/73 348/148 |
| 2011/0202225 A1* | 8/2011 | Willis | .................. | G01C 25/005 702/85 |
| 2013/0090830 A1* | 4/2013 | Eisele | .................... | B60K 31/00 701/1 |

(Continued)

FOREIGN PATENT DOCUMENTS

| | | |
|---|---|---|
| CN | 107003521 A | 8/2017 |
| DE | 10 2013 019 117 A1 | 5/2015 |

(Continued)

OTHER PUBLICATIONS

English-language Chinese Office Action issued in Chinese application No. 201880046821.5 dated Dec. 21, 2021 (Five (5) pages).
PCT/EP2018/062668, International Search Report dated Aug. 21, 2018 (Two (2) pages).

(Continued)

*Primary Examiner* — Jonathan M Dager
*Assistant Examiner* — Jean W Charleston
(74) *Attorney, Agent, or Firm* — Crowell & Moring LLP

(57) ABSTRACT

A method for operating an assist system for a vehicle that includes a sensor device for detecting a directional characteristic value that is representative of a viewing direction of a driver of the vehicle. In the method, a calibration characteristic value is provided that is representative of a rest viewing direction of a standard driver. At least one initial direction characteristic value is determined, in dependence of which a rest characteristic value is determined that is representative of a rest viewing direction of the driver. A (Continued)

transformation characteristic value is determined based on the rest characteristic value, which is representative of a transformation between the rest characteristic value and the calibration characteristic value. Based on the transformation characteristic value, subsequently determined directional characteristic values are corrected.

5 Claims, 1 Drawing Sheet

(51) Int. Cl.
    *G06V 20/59*     (2022.01)
    *B60W 40/08*     (2012.01)
    *B60W 50/00*     (2006.01)

(52) U.S. Cl.
    CPC .............. *B60W 2050/0083* (2013.01); *B60W 2520/10* (2013.01); *B60W 2520/14* (2013.01); *B60W 2540/18* (2013.01); *B60W 2540/225* (2020.02); *B60W 2552/05* (2020.02)

(58) Field of Classification Search
    CPC ......... B60W 2520/10; B60W 2520/14; B60W 2540/18; B60W 2540/225; B60W 2552/05; B60W 2050/0085; G02B 27/0093
    USPC ............................................................ 701/85
    See application file for complete search history.

(56) References Cited

U.S. PATENT DOCUMENTS

| | | | |
|---|---|---|---|
| 2013/0158741 A1* | 6/2013 | Hahne | G08B 21/06 |
| | | | 701/1 |
| 2013/0235169 A1 | 9/2013 | Kato et al. | |
| 2015/0138066 A1 | 5/2015 | Seok et al. | |
| 2015/0307105 A1* | 10/2015 | Huber | B60W 40/08 |
| | | | 340/576 |
| 2015/0344032 A1* | 12/2015 | Oh | B62D 6/00 |
| | | | 348/46 |
| 2016/0085301 A1 | 3/2016 | Lopez | |
| 2016/0207473 A1* | 7/2016 | Neisius | G06V 20/56 |
| 2016/0221575 A1* | 8/2016 | Posch | B60W 30/14 |
| 2016/0328851 A1* | 11/2016 | Garcia | G01B 11/002 |
| 2019/0102638 A1* | 4/2019 | Nanu | G06T 7/50 |

FOREIGN PATENT DOCUMENTS

| | | |
|---|---|---|
| DE | 10 2014 008 852 A1 | 12/2015 |
| DE | 10 2015 204 283 A1 | 9/2016 |
| DE | 10 2015 214 116 A1 | 2/2017 |
| DE | 10 2015 215 994 A1 | 2/2017 |
| DE | 10 2015 222 682 A1 | 5/2017 |
| WO | WO 2016/045784 A1 | 3/2016 |

OTHER PUBLICATIONS

German Search Report issued in German counterpart application No. 10 2017 214 546.3 dated Mar. 5, 2018, with Statement of Relevancy (Nine (9) pages).

* cited by examiner

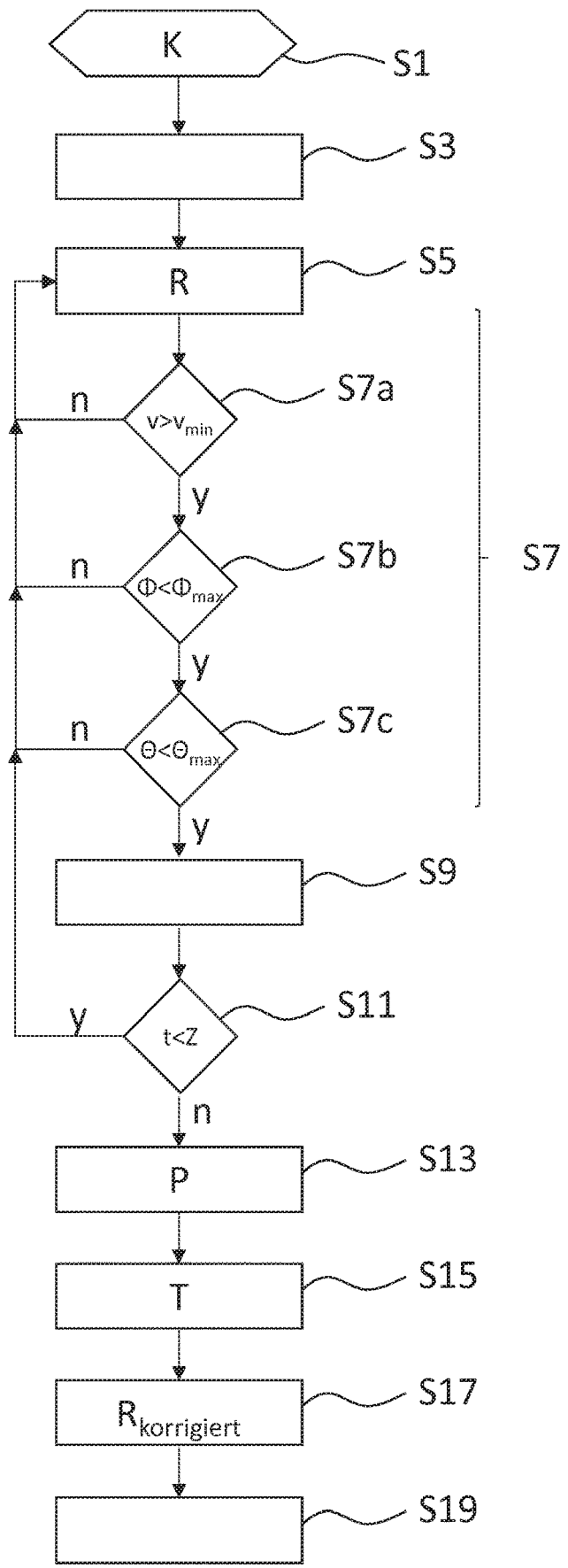

METHOD FOR OPERATING AN ASSIST SYSTEM FOR A VEHICLE, AND ASSIST SYSTEM

CROSS REFERENCE TO RELATED APPLICATIONS

This application is a continuation of PCT International Application No. PCT/EP2018/062668, filed May 16, 2018, which claims priority under 35 U.S.C. § 119 from German Patent Application No. 10 2017 214 546.3, filed Aug. 21, 2017, the entire disclosures of which are herein expressly incorporated by reference.

BACKGROUND AND SUMMARY OF THE INVENTION

The invention relates to a method for operating an assistance system for a vehicle and to a corresponding assistance system, computer program and computer program product.

Modern assistance systems for capturing visual attentiveness of the driver may comprise, for example, a camera sensor which captures a head pose, a viewing direction and/or a viewing position of a user, for example on the basis of facial features.

A head model used in this case is usually based on specific anatomical or physiological features, such as corners of the eyes, corners of the mouth, tip of the nose, the relationship of which with respect to one another is generally different across different head types. Errors can therefore arise when determining the viewing direction and/or the head pose, which errors impair the capture of the attentiveness of the driver.

The object on which the invention is based is to provide a method for operating an assistance system for a vehicle and a corresponding assistance system which allows precise capture of the attentiveness of the driver across users.

According to a first aspect, the invention relates to a method for operating an assistance system for a vehicle. The assistance system comprises in this case a sensor device for determining a direction characteristic value representative of a viewing direction of a driver of the vehicle.

In the method, a calibration characteristic value representative of a resting viewing direction of a standard driver is provided; at least one initial direction characteristic value is determined, on the basis of which a resting characteristic value representative of a resting viewing direction of the driver is determined; a transformation characteristic value representative of a transformation between the resting characteristic value and the calibration characteristic value is also determined on the basis of the resting characteristic value and the calibration characteristic value; finally, subsequently determined direction characteristic values are corrected on the basis of the transformation characteristic value.

This advantageously makes it possible to more accurately measure the viewing direction than is possible without calibration or adaptation to the individual anatomy of the corresponding driver. It is therefore possible to make statements, for example with greater accuracy, with regard to where the driver is looking, which objects are focused on by the driver and/or where the driver's visual attentiveness lies. In particular, it is thus possible to ensure an increased quality for statements regarding whether the driver is suitably attentive based on a driving situation.

In this case, use is made of the knowledge, in particular, that the relationship of the above-mentioned specifically anatomical or physiological features with respect to one another is generally different across different head types and deviations which are intraindividually relatively constant occur when determining the head horizontal, in particular. A discrepancy between the real area of attentiveness (in which a viewing angle of the driver actually lies) and a measured head inclination (and an area of attentiveness derived therefrom) can be reduced when assessing the vertical orientation ("pitch" or inclination) as a result of the calibration according to the first aspect. This makes it possible to ensure particularly precise capture of the visual attentiveness.

The sensor device may be, in particular, a camera. The direction characteristic value describes a head pose of the driver, in particular. The head pose comprises, for example, an inclination of the driver's head. Alternatively or additionally, the head pose may also comprise a rotation ("yaw") of the head. For example, the head pose can be described using a nose vector. Depending on the calibration operation or determination of the transformation characteristic value, between 1 and 10,000, in particular 5000, initial direction characteristic values can be determined, for example.

A resting viewing direction is understood as meaning, in particular, a viewing direction or head pose assumed by a driver when "looking straight ahead". For example, it may be an averaged viewing direction or head pose during normal operation of the vehicle. A determined or estimated average resting viewing direction of a multiplicity of comparative persons, in particular, is referred to as a resting viewing direction of a standard driver.

The transformation characteristic value may be a transformation matrix, for example. Alternatively, the transformation characteristic value can also describe an offset which is subtracted from subsequent direction characteristic values.

In one advantageous configuration according to the first aspect, the resting characteristic value is determined once in a predefined time window. For example, the resting characteristic value is determined once each time a journey begins. Alternatively, the resting characteristic value is respectively determined in predefined time windows which are spaced apart. For example, the resting characteristic value can be determined again in each case at an interval of one to several hours. In an advantageous manner, the assistance system can therefore be adapted to a change in the sitting posture of the driver during longer journeys. The initial direction characteristic values determined in this context can be, for example, accumulated, for example averaged, in order to determine the respective current resting characteristic value. Alternatively, previous initial direction characteristic values can be rejected when determining the respective current resting characteristic value. In this context, it is conceivable to use previous initial direction characteristic values to check the plausibility of the respective current resting characteristic value. (Continuous) averaging of the determined resting characteristic values is also conceivable.

In another advantageous configuration according to the first aspect, the resting characteristic value is also determined on the basis of one or more of the following parameters:

current speed of the vehicle,
current steering angle and/or yaw rate of the vehicle,
current deviation of the direction characteristic value from the calibration characteristic value,
road type currently being traveled on.

For example, a minimum speed for determining the resting characteristic value is 10 m/s. Alternatively or additionally, a minimum cornering radius of the vehicle for determining the resting characteristic value is more than 50 m to 500 m, for example; in particular, the vehicle can also travel straight ahead. Alternatively or additionally, a maximum yaw rate of the vehicle for determining the resting characteristic value is $1/100$ rad/s, for example. Alternatively or additionally, a maximum rotation of the driver's head for determining the resting characteristic value is between 5° and 10°, for example; it is possible to determine whether a rotation of the head exceeds the maximum rotation on the basis of a deviation of the direction characteristic value from the calibration characteristic value, for example. Alternatively or additionally, the resting characteristic value is determined on the basis of a road type currently being traveled on; the resting characteristic value is therefore not determined, for example, if the vehicle is in a town; the resting characteristic value is only determined when traveling on a freeway, for example.

According to a second aspect, the invention relates to an assistance system for a vehicle. The assistance system comprises a sensor device for determining a direction characteristic value representative of a viewing direction of a driver of the vehicle. The assistance system also comprises a control unit which is configured to carry out the method according to the first aspect.

According to a third aspect, the invention relates to a computer program for operating an assistance system. The computer program is designed to carry out a method according to the first aspect when executed on a data processing apparatus.

According to a fourth aspect, the invention relates to a computer program product comprising executable program code. The program code carries out the method according to the first aspect when executed by a data processing apparatus.

Exemplary embodiments of the invention are explained in more detail below on the basis of the schematic drawing.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE shows an exemplary flowchart of a method for operating an assistance system according to the invention.

DETAILED DESCRIPTION OF THE DRAWING

The FIGURE shows an exemplary flowchart of a method for operating an assistance system according to the invention. The assistance system may be, for example, an apparatus for capturing visual attentiveness of the driver, which apparatus is configured to detect a head pose of the driver and to initiate further steps on the basis thereof. For example, the determined head pose can be used to monitor the driver's attentiveness and to utter warnings if necessary. Alternatively or additionally, the determined head pose can be used to assist with detecting the viewing direction and/or to deliberately activate additional functions of the vehicle.

The assistance system comprises a sensor unit having a camera which is arranged in a manner facing the driver and is configured to capture his/her head pose. Additionally, the camera can be configured to capture a viewing direction and/or a head position of the driver. When determining the head pose, viewing direction and/or head position, anatomical features such as the nose (tip), eye and/or pupil position, corners of the eyes and/or corners of the mouth of the driver and relationships between these features can be used, for example. The sensor unit can also comprise an optional lighting device. The assistance system also comprises a control unit having a data and program memory which stores a program for operating the assistance system, which program is explained in more detail below on the basis of the flowchart in the FIGURE.

The program is started in a step S1 in which variables are initialized, for example. At this time, it is possible to provide, in particular, a calibration characteristic value K which is representative of a resting head pose of a standard driver, that is to say a head pose of an average driver when "looking straight ahead". The program is then continued in a step S3.

In step S3, a predefined time window Z for calibrating the assistance system is started. This can be carried out once for the purpose of activating the vehicle or else at the beginning of a (each) journey with the vehicle, for example. In other embodiment variants, the predefined time window Z can also be started after expiry of a predefined interval of time (for example every 2 hours), for example in order to ensure that the assistance system is continuously calibrated. The program is then continued in a step S5.

In step S5, the sensor unit is used to determine a direction characteristic value R which is representative of a current head pose and/or a current viewing direction of the driver. The program is then continued in step S7.

In step S7, a check is carried out in order to determine whether there are specific conditions which allow the calibration to be carried out. For example, for this purpose, a current speed v of the vehicle is determined in a step S7a and a check is carried out in order to determine whether a predefined minimum speed $v_{min}$ of the vehicle has been reached or exceeded. If the current speed v is below the predefined minimum speed $v_{min}$, the current direction characteristic value R is not taken into account. In this case, the program is continued in step S5 after a predefined waiting time.

Otherwise, the program is continued, for example, in a step S7b in which a current rotation Φ of the vehicle is determined and a check is carried out in order to determine whether a predefined maximum rotation $Φ_{max}$ of the vehicle has been reached or exceeded. An adopted steering angle and/or a yaw rate of the vehicle, for example, can fall under a rotation Φ of the vehicle. If the current rotation Φ of the vehicle is above the predefined maximum rotation $Φ_{max}$ of the vehicle, the current direction characteristic value R is not taken into account. In this case, the program is continued in step S5 after a predefined waiting time Otherwise, the program is continued, for example, in a step S7c in which a current rotation Θ of the driver's head is determined and a check is carried out in order to determine whether a predefined maximum rotation $Θ_{max}$ of the driver's head has been reached or exceeded. The rotation Θ of the driver's head can be derived, for example, from the current direction characteristic value R. In particular, the rotation Θ of the driver's head can be determined on the basis of the (uncalibrated) direction characteristic value R and the calibration characteristic value K which has been provided and is stored, for example, in the memory. In this context, a deviation of the direction characteristic value R from the calibration characteristic value K is determined, for example. If the current rotation Θ of the head is above the predefined maximum rotation $Θ_{max}$ of the head, the current direction characteristic value R is not taken into account. In this case, the program is continued in step S5 after a predefined waiting time.

Otherwise, the program is then continued in step S9. In a manner differing from the illustrated and described embodiment variant, individual or all substeps S7a-S7c can be run through in another order or may be only optional in further embodiment variants.

In step S9, the direction characteristic value R currently determined by the sensor unit is written to a buffer. The program is then continued in a step S11.

In step S11, a check is carried out in order to determine whether the predefined time window Z has expired. In this case, the program is continued in a step S13; otherwise, the program is continued in step S5.

In step S13, a resting characteristic value P representative of a resting head pose of the driver, that is to say an individual head pose of the driver when "looking straight ahead", is determined on the basis of the direction characteristic values R in the buffer. For this purpose, the direction characteristic values R are accumulated, for example, and a mean value or the like is determined. The resting head pose can also be referred to as a "normal zero head pose". The program in is then continued in a step S15.

In step S15, a transformation characteristic value T representative of a transformation between the resting characteristic value P, that is to say, for example, an average resting head pose of the driver, and the calibration characteristic value K, that is to say an average resting head pose of other drivers, is determined. The transformation may be, in particular, a rigid transformation which can be described, for example, by a homogeneous 4×4 transformation matrix as the transformation characteristic value T. The resting characteristic value P and the calibration characteristic value K can be described, for example, as homogeneous vectors in this context. The transformation characteristic value T can then be stored for the corresponding driver and the program can be ended. Alternatively, the program can then also be continued in a step S17.

In step S17, the transformation characteristic value T for the corresponding driver is provided. Furthermore, a new, current direction characteristic value $R_{neu}$ is determined. A corrected direction characteristic value $R_{korrigiert}$ is then determined on the basis of the transformation characteristic value T and the new direction characteristic value $R_{neu}$. The corrected direction characteristic value $R_{korrigiert}$ is representative, in particular, of a head pose of the driver which is compensated for by the unknown individual anatomy of the driver.

In other words, the measured direction characteristic value $R_{neu}$ can be corrected with the transformation for all future measurements provided by the sensor unit. In the case of a homogeneous 4×4 transformation matrix, this would correspond to a matrix-vector multiplication of the transformation characteristic value T by the homogeneous vector, the direction characteristic value $R_{neu}$, which describes the measured head pose.

The program can then be continued in a step S19 in which a control signal for operating further functions of the vehicle is determined on the basis of the corrected direction characteristic value $R_{korrigiert}$. The program is then ended.

In this embodiment variant, steps S5 to S15 are repeated only until a predefined time window Z has expired. In other embodiment variants, an interval of time can be started in step S15 after expiry of the predefined time window Z, after the expiry of which interval of time the program begins again in step S3 in order to thus carry out a continuous calibration at defined intervals of time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an assistance system for a vehicle including a sensor device for determining a direction characteristic value representative of a viewing direction of a driver of the vehicle, comprising the acts of:
   providing a calibration characteristic value representative of a resting viewing direction of a standard driver, wherein the calibration characteristic value describes a head pose of the standard driver and wherein the resting viewing direction of the standard driver is looking straight ahead;
   determining at least one initial direction characteristic value of the driver, wherein the at least one initial direction characteristic value describes a head pose of the driver;
   determining a resting characteristic value representative of a resting viewing direction of the driver on a basis of the at least one initial direction characteristic value;
   determining a transformation characteristic value representative of a transformation between the resting characteristic value and the calibration characteristic value on a basis of the resting characteristic value and the calibration characteristic value; and correcting subsequently determined direction characteristic values on a basis of the transformation characteristic value.

2. The method according to claim 1, wherein the resting characteristic value is respectively determined in predefined time windows which are spaced apart.

3. The method according to claim 1, wherein the resting characteristic value is also determined on a basis of one or more of: a current steering angle and/or a yaw rate of the vehicle; a current deviation of the direction characteristic value from the calibration characteristic value; and a road type currently being traveled on by the vehicle.

4. An assistance system for a vehicle, comprising:
   a control unit which is configured to perform the method according to claim 1.

5. A non-transitory computer readable medium comprising executable program code, wherein the program code carries out the method according to claim 1 when executed by a data processing apparatus.

* * * * *